United States Patent
Maslennikov et al.

(10) Patent No.: US 8,073,387 B2
(45) Date of Patent: Dec. 6, 2011

(54) ON FREQUENCY REPEATER WITH AGC STABILITY DETERMINATION

(75) Inventors: Nikolai Maslennikov, Huntington Beach, CA (US); Alexander Rabinovich, Cypress, CA (US); Ezmarai Arbab, Laguna Niguel, CA (US)

(73) Assignee: Powerwave Technologies, Inc., Santa Ana, CA (US)

( * ) Notice: Subject to any disclaimer, the term of this patent is extended or adjusted under 35 U.S.C. 154(b) by 705 days.

(21) Appl. No.: 12/154,179

(22) Filed: May 20, 2008

(65) Prior Publication Data

US 2008/0293360 A1 Nov. 27, 2008

Related U.S. Application Data

(60) Provisional application No. 60/931,220, filed on May 22, 2007.

(51) Int. Cl.
*H04B 7/14* (2006.01)

(52) U.S. Cl. ............... 455/24; 455/7; 455/9; 455/11.1; 455/13.1; 455/67.11

(58) Field of Classification Search .............. 455/24, 455/22, 11.1, 9, 16, 41.2, 13.4, 8, 67.13, 455/69, 522, 85, 552.1, 571, 135, 220, 222, 455/341, 283, 561, 296, 307, 7, 452.1, 126, 455/13.1, 67.11; 370/31, 6, 241; 375/345
See application file for complete search history.

(56) References Cited

U.S. PATENT DOCUMENTS

| | | | | |
|---|---|---|---|---|
| 3,962,549 A * | 6/1976 | Zuk | ............................... | 327/178 |
| 4,435,845 A * | 3/1984 | Timm et al. | ................... | 455/228 |
| 4,450,555 A * | 5/1984 | Pays | .............................. | 370/201 |
| 5,659,893 A * | 8/1997 | Enoki et al. | ................... | 455/126 |
| 5,809,398 A | 9/1998 | Moberg et al. | | |
| 5,815,795 A | 9/1998 | Iwai | | |
| 5,987,304 A | 11/1999 | Latt | | |
| 6,169,638 B1 * | 1/2001 | Morling | ........................ | 360/46 |
| 7,209,703 B1 * | 4/2007 | Yarkosky | ........................... | 455/9 |
| 7,565,106 B1 * | 7/2009 | Oh et al. | ........................... | 455/7 |
| 7,706,744 B2 * | 4/2010 | Rodgers et al. | .............. | 455/11.1 |
| 7,974,573 B2 * | 7/2011 | Dean | ................................ | 455/9 |
| 2002/0131099 A1 | 9/2002 | Harasawa | | |
| 2003/0224752 A1 * | 12/2003 | Rawlins et al. | ............... | 455/307 |
| 2005/0272367 A1 * | 12/2005 | Rodgers et al. | .............. | 455/11.1 |
| 2006/0041680 A1 * | 2/2006 | Proctor, Jr. et al. | ........... | 709/238 |
| 2006/0084379 A1 | 4/2006 | O'Neill | | |
| 2007/0188235 A1 * | 8/2007 | Dean | .......................... | 330/278 |
| 2007/0296500 A1 * | 12/2007 | Yang | ............................. | 330/278 |
| 2010/0086086 A1 * | 4/2010 | Rawlins et al. | ............... | 375/345 |

OTHER PUBLICATIONS

International Search Report and Written Opinion for International Application No. PCT/US2008/006473 dated Aug. 8, 2008, 8 pages.

* cited by examiner

*Primary Examiner* — Tan Trinh
(74) *Attorney, Agent, or Firm* — OC Patent Law Group

(57) ABSTRACT

An on frequency repeater for wireless networks with feedback oscillation detection is disclosed. The on frequency repeater includes an automatic gain control loop which samples amplified signal envelope. The automatic gain control loop is monitored and a characteristic saw tooth pattern in the gain control loop indicating feedback oscillation is detected. A nonlinear gain expander circuit may be periodically activated to allow feedback oscillation detection in repeater applications employing linearized amplifiers.

20 Claims, 9 Drawing Sheets

ON FREQUENCY REPEATER WITH AGC STABILITY DETERMINATION

RELATED APPLICATION INFORMATION

The present application claims priority under 35 U.S.C. section 119(e) to provisional application Ser. No. 60/931,220 filed May 22, 2007, the disclosure of which is incorporated herein by reference in its entirety.

BACKGROUND OF THE INVENTION

1. Field of the Invention

The present invention is related to radio frequency (RF) on frequency repeaters (OFR) which are used for re-transmission of RF signals from and to Base Stations (BTS) and User Equipment (UE). More particularly, the present invention is related to radio frequency repeaters used in wireless communication applications such as cellular based networks where signals must be retransmitted in order to enhance quality of service within such network.

2. Description of the Prior Art and Related Background Information

Most conventional on frequency repeaters are used in modern telecommunication systems in order to provide enhancement in coverage within a cellular network. In such networks, to preserve signal coverage in areas obstructed by terrain or man made obstructions, repeaters are used to re-transmit signals to and from BTS. Hence, the repeater operation and its performance provide for extended signal coverage not otherwise possible.

Even from the early days of Amplitude Modulation (AM) and later Frequency Modulation (FM) repeaters used in VHF business bands and in more recent cellular telephony, the repeaters have been mostly used in conjunction with Base Stations to achieve the extend coverage of BTS over obstructions such as hilly terrain and the like. On frequency repeaters are designed to solve coverage problems due to weak signals in outdoor and in some instances in indoor locations using balanced amplification of uplink and downlink signals.

In an on frequency repeater the repeater does not utilize frequency translation. In other words reception frequency and the transmission frequency, for example in downlink direction, are the same, while similarly, reception frequency and the transmission frequency for uplink direction are the same. For example, a repeater operating in UMTS band would receive downlink signals from the BTS in 2110 to 2170 frequency range, amplify them and retransmit toward UE, for example a mobile telephone. Similarly, in the uplink direction the repeater operating in UMTS band would receive uplink signals from UE in 1920 to 1980 MHz band, amplify them, and retransmit toward BTS. Conventionally the antenna in communication with the BTS is referred to as a donor antenna and the antenna used to re-transmit signals to UE's is referred to as a service antenna.

Since the repeater receives and transmits on the same frequency there is always a possibility that the repeater may oscillate due to a self induced radio signal feedback from transmitting to receiving antenna. Due to the bi-directional nature of an on frequency repeater the radio signal feedback may occur in either the downlink or uplink direction. Various methods have been proposed to attenuate the radio signal feedback and to sufficiently reduce the received portion of the transmission radio wave of repeater. Some of these methods utilize directional antennas, while other methods propose utilization of a plurality of antennas to reduce such feedback path.

One of the primary commissioning issues with on frequency repeaters is to provide sufficient radio frequency attenuation between the two repeaters' antennas so as to prevent a self induced radio signal feedback. Commissioning of the repeater requires careful placement and orientation of antenna's and ability to detect and mitigate feedback oscillation. Additionally, operation of an on frequency repeater in a wireless network must be oscillation free while being capable of detecting feedback oscillation, whilst operating with any combination of wireless signal formats such as but not limited to TDMA, GSM, CDMA, WCDMA and others as well being oscillation free when no signals are present at either antenna.

Full time feedback oscillation detection is mandated due to changing operating circumstances, for example, the growth of trees in the vicinity of the wireless repeater may cause the multi path reflection and scattering of radio waves to vary significantly, therefore changing coupling between donor and service antennas of the repeater and cause it to oscillate. When the repeater oscillates, the output signal of the wireless repeater is conventionally hard limited to a predetermined output power level by an Automatic Gain Circuit (AGC) circuit.

An Automatic Gain Circuit (AGC) circuit is primarily used to limit output signal power of the repeater to predetermined power level. Since it is possible for UE, such as a mobile telephone, to be in near proximity of a repeater, the uplink communication radio wave signals may be of a sufficient level to cause distortion and thus cause harmful interference to adjacent services. Under these operational conditions, the repeater's output signal in the uplink path may increase, but due to action of the AGC will be kept at a safe, predetermined maximum output level. AGC is used to limit the output signal of the uplink, and coincidently downlink path, to a predetermined maximum output level.

The on frequency repeater (OFR) must be equipped with an AGC circuit capable of distinguishing between its feedback oscillation and input signals transmitted by numerous UE's. Many conventional AGC circuits utilize low pass filtered output control voltage which is directly proportionate to the detected signal envelope, whereas when the repeater oscillates the input signal levels increase rapidly until operational limits are reached. Conventional AGC circuits are only marginally able or insufficient to resolve the onset of oscillation and thus additional means must be employed to determine oscillatory condition.

Previous attempts to detect oscillatory condition in on frequency repeater focused primarily on received signal envelope detection and post filtering. This approach has severe limitations as it relies on inherent nature of received signal envelope. In one such example, as described in U.S. Pat. No. 5,815,795, an AGC system is equipped with oscillation detecting circuit comprising a band pass filter (BPF) in addition to an envelope detector and a low pass filter. Due to the burst nature of TDMA telephony signals each frame in TDMA system is divided into a plurality of time slots allocated to mobile stations (UE's). The duration of the TDMA frame is 20 ms and the center frequency of the band pass filter is set to 50 Hz. Output of this band pass filter is applied to alternating current level detector which is used to establish presence of TDMA signal. If the repeater self oscillates, a BPF filter will block all signals since the oscillatory condition envelope is constant.

Accordingly, an improved method for detecting oscillation in an on frequency repeater is needed.

SUMMARY OF THE INVENTION

The present invention provides a system and method of automatically detecting if an on frequency wireless repeater is oscillating. Accordingly, the present invention also provides an improved on frequency repeater.

In a first aspect the present invention provides an on frequency repeater for a wireless network, comprising a first antenna that is directed toward a first selected location in the wireless network to receive RF signals from the first selected location, an amplification chain coupled to the received signal and amplifying the level of the received signal to generate an amplified RF signal, and a second antenna spaced apart from the first antenna and receiving and transmitting the amplified RF signal to a second location in the wireless network. The repeater further comprises a feedback oscillation detection circuit coupled to the amplification chain in a gain control loop including a gain adjustment circuit and a gain control circuit, the feedback oscillation detection circuit detecting a saw tooth waveform in the gain control loop to detect onset of feedback oscillation between the first and second antennas.

In a preferred embodiment of the on frequency repeater the gain control loop further comprises a signal level detector coupled to the amplification chain. The signal level detector preferably comprises an envelope detector. The gain control loop preferably also further comprises an RC filter circuit coupled to the output of the signal level detector. The amplification chain preferably includes an intermediate frequency amplification stage and an RF power amplifier and the signal level detector may be coupled to the output of the intermediate frequency amplification stage. Alternatively, the signal level detector may be coupled to the output of the RF power amplifier. The first antenna may be a donor antenna that is directed toward a selected base station and the second antenna a service antenna that is directed toward a selected user coverage area. The on frequency repeater may further comprise an uplink path between the second antenna and the first antenna, the uplink path comprising a second amplification chain receiving and amplifying RF signals from the second antenna and providing them to the first antenna for transmission to the first location. The gain adjustment circuit may comprise a voltage variable attenuator. The feedback oscillation detection circuit may issue a feedback oscillation warning signal upon detecting the saw tooth waveform indicating onset of feedback oscillation. The feedback oscillation detection circuit may also reduce a gain setting of the amplification chain upon detecting the saw tooth waveform indicating onset of feedback oscillation.

In another aspect the present invention provides an on frequency repeater for a wireless network, comprising a first antenna that is directed toward a first selected location in the wireless network to receive RF signals from the first selected location, an amplification chain coupled to the received signal and amplifying the level of the received signal to generate an amplified RF signal, a nonlinear gain expander circuit coupled in the signal path of the amplification chain, and a second antenna spaced apart from the first antenna and receiving and transmitting the amplified RF signal to a second location in the wireless network. The repeater further comprises a feedback oscillation detection circuit coupled to the amplification chain in a gain control loop including a gain adjustment circuit and a gain control circuit, wherein the feedback oscillation detection circuit is coupled to control the gain expander circuit to selectively provide a nonlinear gain response, the feedback oscillation detection circuit detecting a saw tooth waveform in the gain control loop to detect onset of feedback oscillation between the first and second antennas during operation of the gain expander circuit.

In a preferred embodiment of the on frequency repeater the feedback oscillation detection circuit controls operation of the gain expander circuit to provide the nonlinear gain expansion when the repeater is not in user service. The feedback oscillation detection circuit preferably controls operation of the gain expander circuit to provide the nonlinear gain expansion periodically for oscillation monitoring.

In another aspect the present invention provides a method for detecting feedback oscillation in a repeater having first and second antennas and one or more amplification paths. The method comprises detecting a signal level in the amplification path, controlling the gain of the amplification path in response to the detected signal level with a gain control signal, and detecting a periodic nonlinear pattern in the gain control signal corresponding to onset of feedback oscillation between the antennas.

In a preferred embodiment of the method for detecting feedback oscillation in a repeater the periodic nonlinear pattern in the gain control signal comprises a saw tooth pattern. Detecting a signal level in the amplification path preferably comprises detecting a signal envelope. The method for detecting feedback oscillation in a repeater may further comprise filtering the detected signal envelope. The method may further comprise selectively providing an additional nonlinear gain to the amplification path and the detecting of a periodic nonlinear pattern in the gain control signal is performed while providing the additional nonlinear gain. The additional nonlinear gain to the amplification path is provided when the repeater is not in user service.

Further features and advantages of the present invention will be appreciated from the following detailed description of the invention.

DETAILED DESCRIPTION OF THE INVENTION

Reference will be made to the accompanying drawings, which assist in illustrating the various pertinent features of the present invention. The present invention will now be described primarily in solving feedback stability detection and mitigation while operable with plurality of signals, it should be expressly understood that the present invention may be applicable in other applications where feedback determination in variable signal level environment is required or desired. In this regard, the following description of on frequency repeater (OFR) that solves radio signal feedback between donor and service antennas is presented for purposes of illustration and description.

The present invention provides an improved On Frequency Repeater (OFR). In a preferred embodiment of the present invention, an on frequency repeater (OFR) is provided for a cellular network system having a plurality of BTS and UE's. The OFR includes a donor antenna that is directed toward a selected base station to receive and transmit RF signals to and from such base station. The OFR includes a first amplification chain receptive to the received signal, the amplifier amplifying the level of the received signal to generate an amplified signal in the downlink direction. The repeater further includes a service antenna located at some distance from the donor antenna. The service antenna is driven by downlink amplified signals, and the service antenna positioned to transmit RF signals within a local area providing communication means to UE's located wherein. The aforementioned description provides a brief description for an OFR operating in the downlink direction between the base station and the subscriber units near the repeater. Similarly, the service antenna provides an uplink coverage area proximate to such repeater. Signals received by the service antenna are applied to a second amplification chain receptive to the received signal, the amplifier amplifying the level of the received signal to generate an amplified signal in the uplink direction. Amplified uplink signals are coupled to the donor antenna.

The RF signals received by the donor antenna and the RF signals transmitted by the service antenna may be at substantially the same frequency in the downlink direction. The RF signals received by the service antenna and the RF signals transmitted by the donor antenna may be at substantially the same frequency in the uplink direction. The amplifier includes AGC and RF circuitry therein to substantially prevent feedback oscillation. The circuitry may advantageously prevent occurrence of feedback oscillation by continuously testing for same. The AGC circuitry may reduce amplifier gain if conditions favoring onset of oscillation exist.

Figure 1A:
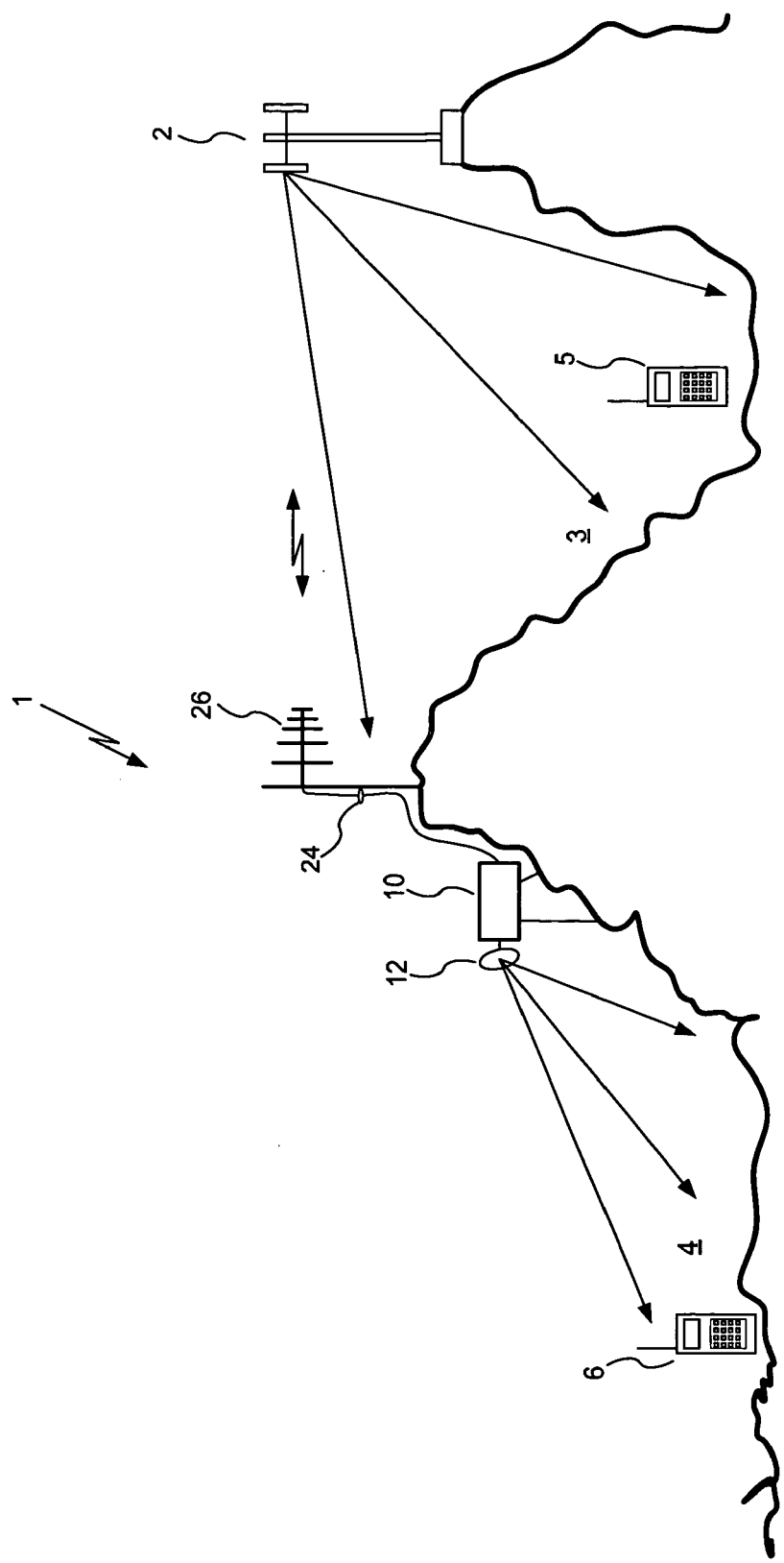
FIG. 1A is a schematic representation of a Cellular Network with an on frequency repeater.
Figure 1B:
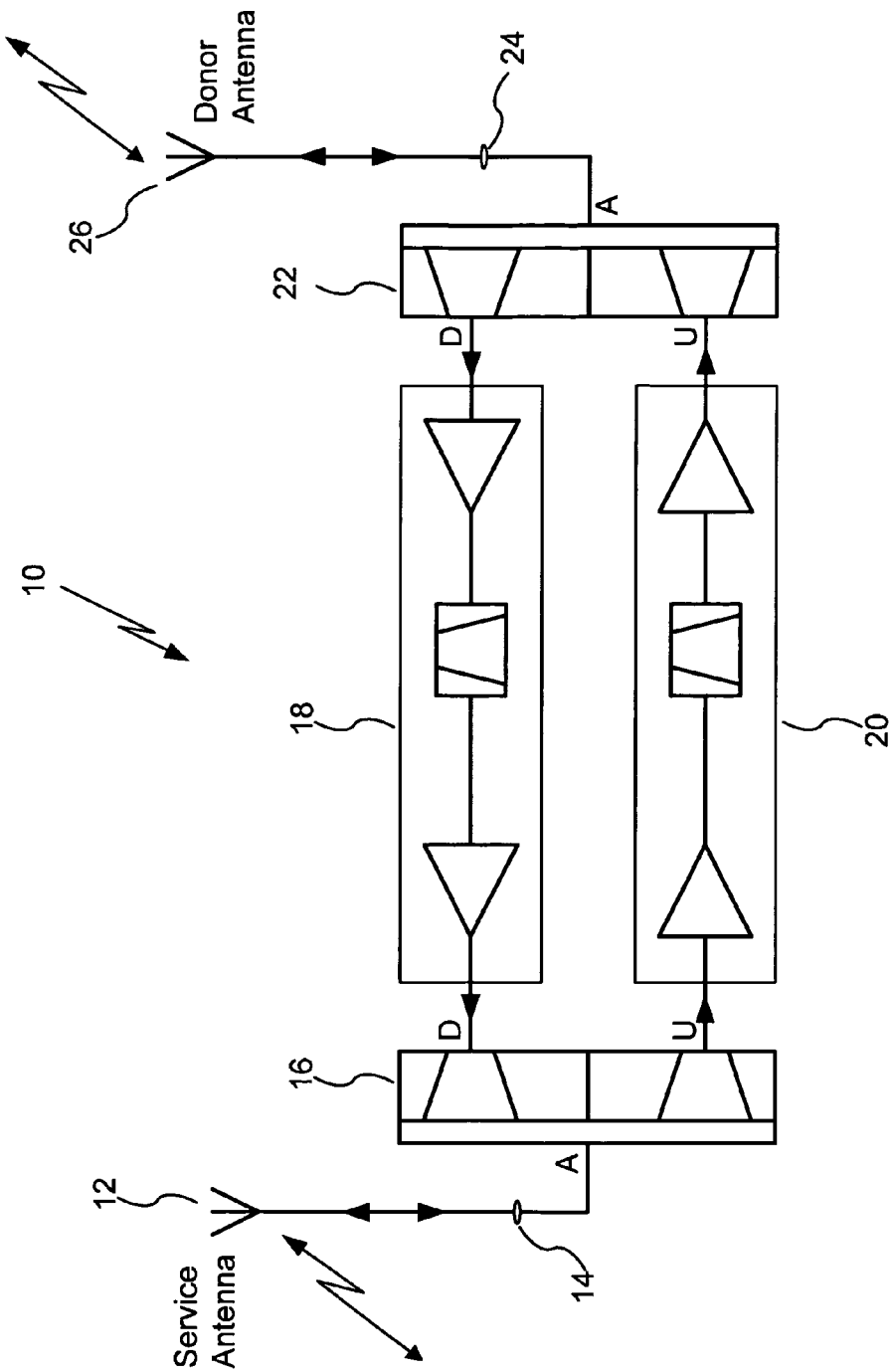
FIG. 1B is a top level schematic of a band select on frequency repeater.
Figure 2:
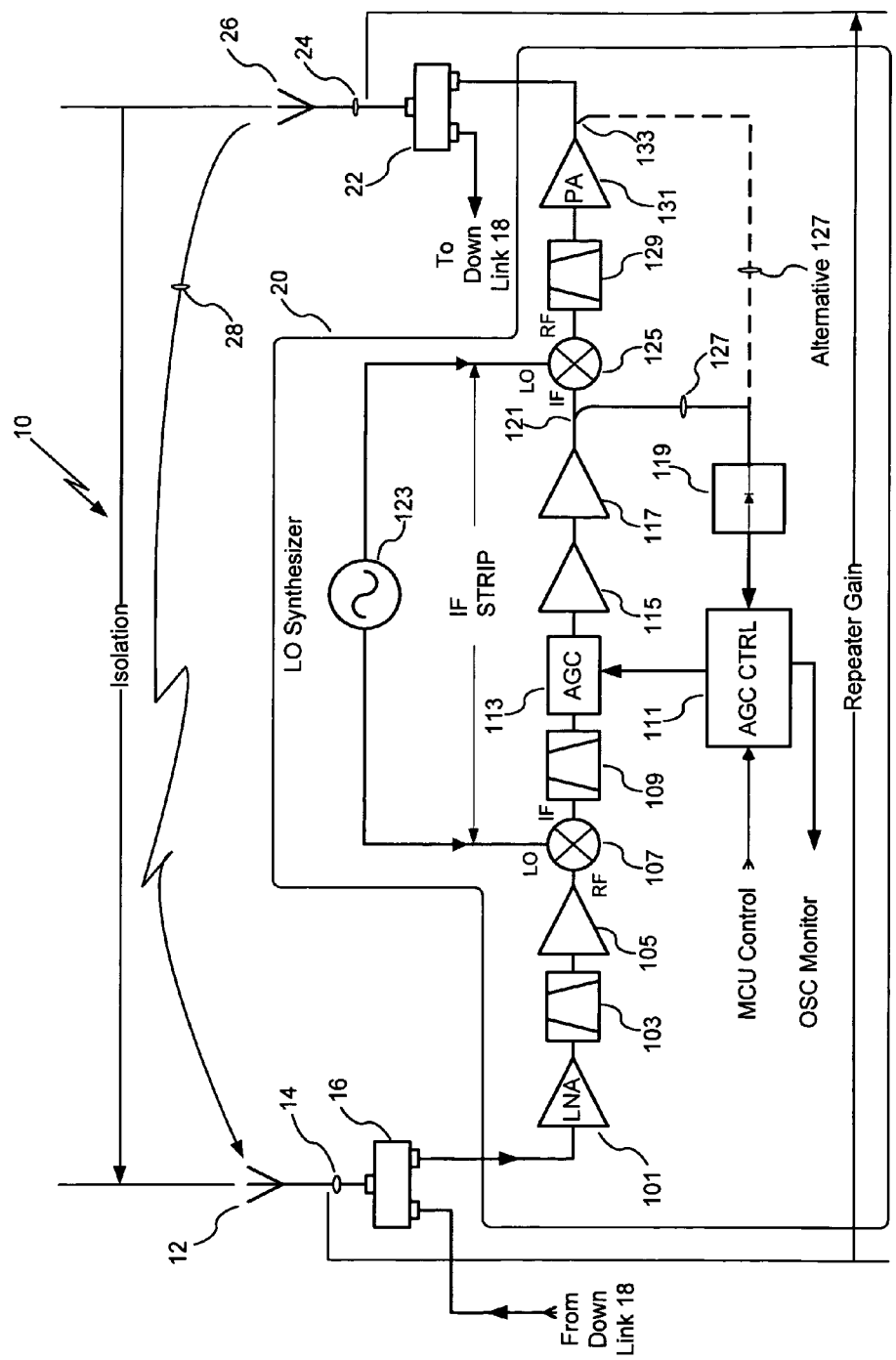
FIG. 2 is a schematic drawing of an uplink path of the on frequency repeater with AGC in accordance with a first (and second) embodiment of the invention.

The basic circuit schematic of a preferred embodiment of the OFR of the present invention is shown in FIG. 2, and is described below. First, however, the basic operational characteristics of a repeater employed in cellular network will be described in relation to FIG. 1A and FIG. 1B.

A repeater system 10 implemented in an illustrative cellular network 1 is shown in FIG. 1A. As can be seen, the repeater system 10 is located on the side of a hill, preferably on the side of the hill facing away from BTS 2 antennas. BTS 2 provides wireless communication services to UE's 5 in the adjacent area. OFR 10 is in communication with BTS 2 and thus extends effective coverage of such BTS 2 to provide service coverage to UE's 6 in extended coverage area 4. Due to terrain features extended coverage area 4 is blocked from direct coverage by BTS 2. Both near 3 and extended 4 coverage areas may have one or more UE's 5 & 6 (cellular or other wireless telephones).

The wireless telephone system 1 may include a plurality of base stations (BTS) 2 located in operational vicinity to the OFR 10. As is well known, each of these additional base stations 2 (not shown) may operate on different transmit and receive frequencies and may utilize CDMA, TDMA, or GSM technologies. The present invention is capable of concurrent operation with the above mentioned systems, accordingly the embodiments described herein all may refer to any one transmission format as well as in combination.

OFR 10 is typically positioned in the area where direct signals from primary BTS 2 are attenuated by local terrain. Generally, donor 26 antenna is a directional antenna advantageously mounted and oriented toward BTS 2. Any suitable directional antenna, for example Yagi, can be used to establish OFR 10 to BTS 2 radio link. Donor 26 antenna is coupled to respective connection 22-A port (FIG. 1B) of the OFR with a suitable radio guide 24 means, for example coaxial cable. Service area 12 antenna is coupled to respective connection 16-A port of the OFR 10. Service area 12 antenna is coupled with a suitable radio guide means 14 to provide broad coverage to UE's 6 in extended 4 coverage area.

With reference to FIG. 1B basic features of the OFR will now be described. OFR 10 comprises two independent amplification chains 18 & 20. First amplification chain 18 is used to amplify signals in downlink direction, wherein RF signals are received from BTS 2 transmitter to be retransmitted to UE 6. Similarly, second amplification chain 20 is used to amplify signals in the uplink direction, wherein RF signals are received from UE's 6 and retransmitted toward BTS 2. Frequency selective duplexers 16 & 22 provide frequency separation between various signal paths so that the same antennas 26 & 12 can be used concurrently for OFR 10 to BTS 2 and OFR 10 to UE's 6 communication paths.

With reference to FIGS. 1B and 2 detailed features of a preferred implementation of the OFR will now be described. In FIG. 2 details for uplink amplification 20 chain are described, whereas downlink amplification 18 chain has been omitted for clarity. The two amplification 18 & 20 chains in practice tend to be very similar and may share similar operational parameters. Alternatively, asymmetric amplification chains may be operatively similar. Suitable implementation details will be appreciated by those skilled in the art from the description of uplink amplification chain 20.

Uplink signals from UE's 6 are received by service antenna 12 and coupled to antenna port 16-A of first diplexer 16. Diplexer can be thought as a dual port band pass filter having one common port. Downlink signals transit with minimum attenuation from port 16-A toward port 16-U, while being effectively attenuated from reaching downlink port 16-D. Output signals from uplink 16-U port are directed toward input port of the Low Noise Amplifier 101 (LNA). Output of the LNA 101 is coupled to a first RF band-pass filter 103 which provides additional uplink signal filtering and image signal rejection. Output of the first RF band-pass filter 103 is coupled to a second amplifier 105 before being applied to the RF port of down mixer 107.

Mixers are well known devices and are used for signal frequency conversion. A mixer converts RF power from one frequency into power at another frequency to make signal processing, such as amplification and or filtering easier. Each amplification chain 18 & 20 uses down 107 and up 125 mixers to perform RF to Intermediate Frequency (IF) and IF to RF conversion, respectively. Each amplification chain employs a Local Oscillator (LO) synthesizer 123 to provide Center Frequency selection for the OFR operational band. A detailed description for a channel and band selective repeaters can be found in U.S. Pat. Nos. 5,809,398 and 5,987,304, respectively, which are assigned to current assignee and incorporated herein by reference.

The IF output port of the down 107 mixer is coupled to IF pass band filter 109. The IF processing strip will now be described. The IF pass band filter 109 provides suitable out of band attenuation so as to select only a narrow selection of frequencies that may contain desired signals for re-transmission toward BTS 2. Continuing on, the filtered IF passband signal at the output port of the IF bandpass filter 109 is coupled to AGC controlled amplitude means 113. AGC controlled amplitude controlled means 113 can be implemented with a suitable circuit known in the art such as a voltage variable attenuator suitably adapted to operate at IF frequency band.

Additional IF gain stages 115 and 117 are used to increase amplitude level of the filtered IF passband to suitable levels before being coupled to IF port of the up-conversion mixer 125. LO signal input to up-conversion mixer 125 is supplied by the LO synthesizer 123. Since the identical LO frequency is used as in down conversion mixer 107, no RF frequency shift is incurred.

RF output port of the upconversion mixer 125 is coupled to a second RF bandpass filter 129. Second RF bandpass filter 129 is used to filter out and essentially attenuate LO and unwanted side band signal resultant from up conversion mixer 125 operation. Output port of the band pass filter 129 is coupled to PA 131 section of the amplification 20 chain. Suitably amplified RF signals are coupled to uplink port of the second diplexer 22 before being applied to donor antenna 26 via suitable radio signal guide means 24.

Signal level detection 119 can be implemented with a suitable envelope detector, such as RF Detector/Controller AD8314 manufactured by Analog Devices Inc, Norwood, Mass. 02062-9106. This device provides is a complete subsystem for the measurement and control of RF signals in the frequency range of 100 MHz to 2.7 GHz, with a typical dynamic range of 45 dB. However, numerous envelope detector alternatives are readily available. In first preferred embodiment signal detector 119 has its input coupled 127 at the output IF stage 117 with a suitable coupler 121. IF strip signal level detection can be readily implemented wherein gain variation of subsequent stages is acceptably small or controlled by other means. Conversely, if gain variation of PA stages 131 is unacceptably high signal detector 119 may be coupled 127 to the output of PA with a suitably constructed signal coupler 133 as indicated by the dashed line. Detected signal envelope from detector 119 is coupled to AGC control and feedback oscillation determination module 111.

Figure 7:
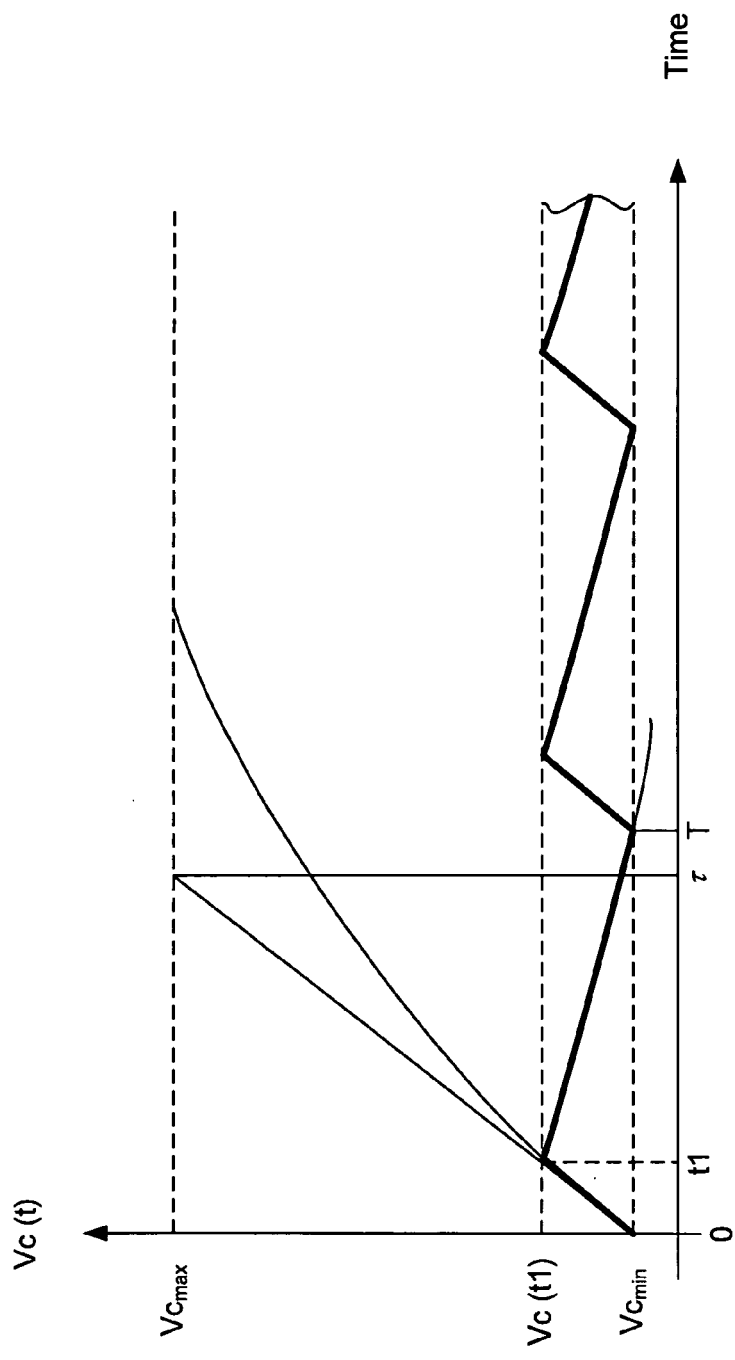
FIG. 7 is a graphical representation of the AGC control voltage while the repeater is marginally stable (onset of oscillation is imminent).

Output of the signal level detector 119 is coupled to AGC Control Module 111 for AGC level setting and self feedback oscillation determination. AGC Control Module 111 accepts control signals from Master Control Unit (MCU), not shown as well as reports self feedback oscillation presence when detected. AGC Control Module 111 may include a circuit or circuits used for determining presence of a saw tooth signal detected by RMS detector 119 for determining onset of self feedback oscillation (as shown in FIG. 7 and as discussed below). The saw tooth wave form detection function can be implemented with either analog or preferably with a digital signal processor (DSP). By utilizing DSP hardware and Fourier transforms and other signal processing techniques additional flexibility not afforded by analog circuits is readily attained.

Figure 3A:
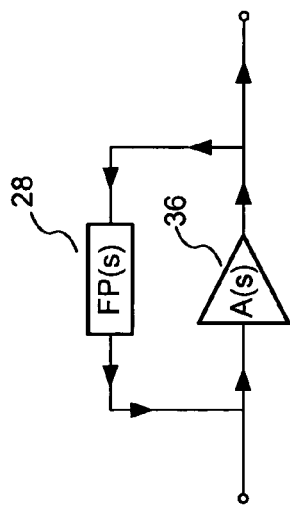
FIG. 3A is a simplified system stability schematic drawing.

Feedback oscillation in amplification chain 20 can be analyzed using a simplified arrangement illustrated in FIG. 3A. As is well known in the art oscillatory condition occurs when there is sufficient positive gain balance in the feedback oscillator loop. All feedback oscillators require some means which provide gain 36 combined with a feedback 28 arrangement that further send some of the system's output back to be re-amplified after a suitable time delay. For an on frequency repeater, gain is provided by many amplification stages, while signal delay is provided by the numerous filters used in amplification chain 20 construction.

As shown in FIG. 3A, amplification chain and related components are simplified to unitary amplifier 36 element which has a voltage gain A(s) whose output is coupled to input with a feedback path 28. Feedback path 28 returns a part, FB(s), of the output voltage to the amplifier's 36 input. Henceforth, consider that both amplifier 36 and feedback 28 path have complex amplitude and phase signal response and thus any signal analysis must take complex frequency response of the two into account.

For basic oscillatory OFR analysis FIG. 3A is used, wherein amplifier 36 and feedback path 28 form a positive feedback (closed) loop. Onset of oscillation commences from initial input signal fluctuation:

$$V_{in}(t)=V_0 e^{-j2\pi ft}$$

And consequently amplifier 36 will produce the following signal output at the amplifier's 36 output terminal:

$$V_{out}(t)=A(f)V_0 e^{-j2\pi ft}$$

A portion of the output $V_{out}$ signal is feedback to amplifier input terminal:

$$V'_{in}(t)=A(f)FB(f)V_0 e^{-j2\pi ft}$$

The new $V_{in}'(t)$ will be again amplified and feedback back to the input terminal of the amplifier. After n trips around the loop the amplitude value of the feedback signal will be:

$$|V|=|A(f)FB(f)|^n|V_0|$$

If the value $|A(f)FB(f)|<1$ then oscillation will eventually dampen out, however if $|A(f)FB(f)|\geqq 1$ oscillation will grow in amplitude with every single path through of the feedback loop provided $\angle A(f)+\angle FB(f)=2\pi n$ where n=1, 2, 3, . . . Marginal instability or at least constant amplitude oscillation will occur when: $|A(f)FB(f)|=1$.

Feedback oscillation can be viewed as a summation of previous signal pass through being stacked to the end of the prior signal perturbation with the same sinusoidal phase. Oscillations, for $|A(f)FB(f)|\geqq 1$, may start with application of initial energy perturbation at the input of the amplifier.

Figure 3B:
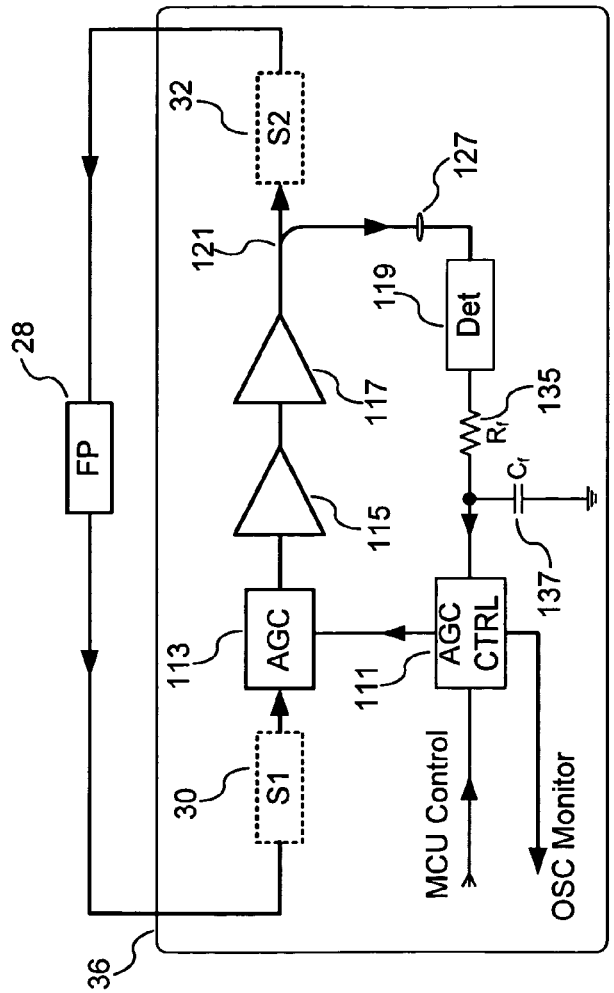
FIG. 3B is a system stability schematic drawing identifying control elements of the on frequency repeater with AGC in accordance with one embodiment of the invention.
Figure 3C:
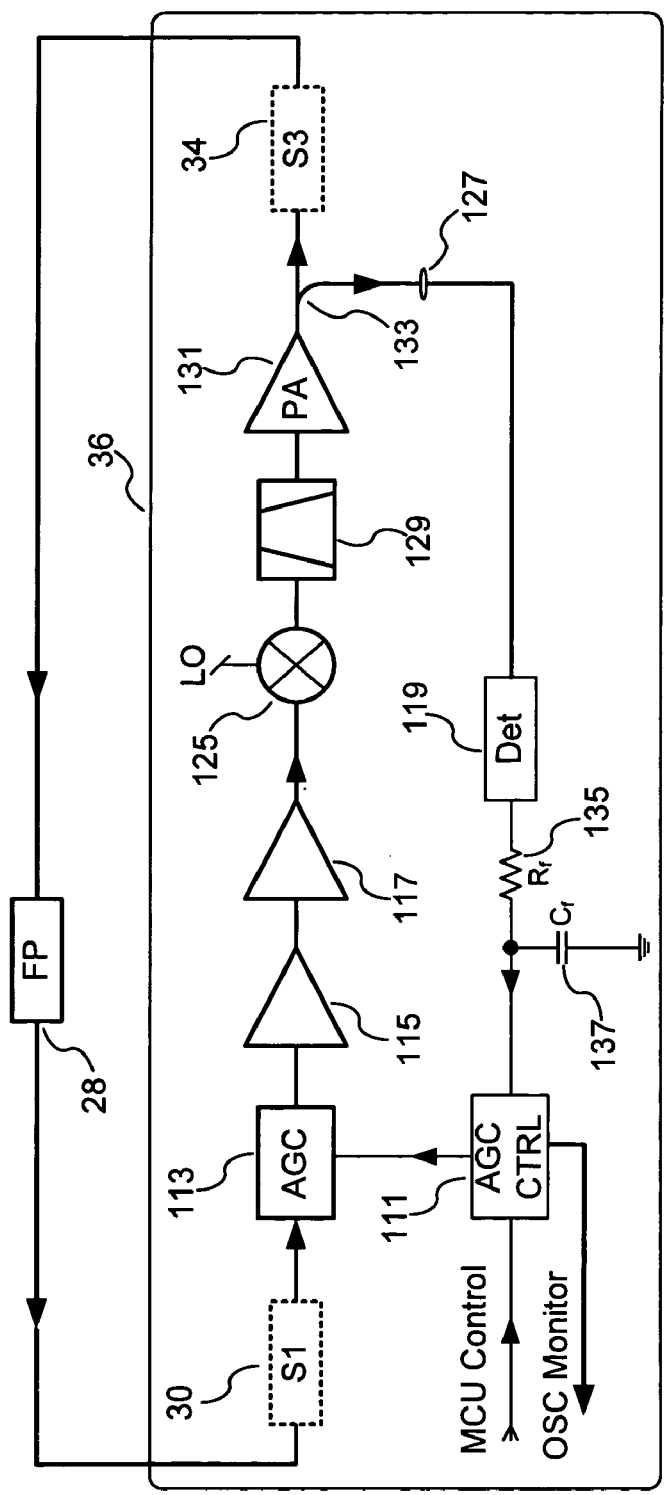
FIG. 3C is a system stability schematic drawing identifying control elements of the on frequency repeater with AGC in accordance with a second embodiment of the invention.

As discussed hereinabove, basic oscillation analysis of FIG. 3A can be further expended to the OFR's specific circuit implementation. With reference to FIGS. 3B and 3C selected OFR circuit elements are combined into functional sub-modules to facilitate oscillation analysis. In order to simplify oscillation analysis several elements of FIG. 2 are combined into equivalent functional modules. In reference to FIG. 3B circuit module S1 (30) combines service antenna 12, service antenna feed line 14, first duplexer 16, LNA 101, Bandpass filter 103, and second amplifier 105. Similarly circuit module S2 (32) provides equivalent amplitude and phase behavior for the following circuit elements: upconversion mixer 125, second bandpass filter 129, PA module 131, coupler 133, second duplexer 22, donor antenna feed line 25 and donor antenna 26. Similarly, In FIG. 3C circuit module S3 (34) provides equivalent amplitude and phase behavior for the following circuit elements: second duplexer 22, donor antenna feed line 25 and donor antenna 26.

It is highly desirable for the OFR to provide oscillation free operation and consequently it is equally paramount for repeater control circuits to determine operational conditions favoring or leading toward the onset of feedback path oscillation. OFR implementations have utilized band pass RF amplifiers with Automatic Gain Control system (AGC) that allows for a constant output power, Pout (over input power (Pin), temperature range, etc) operation, together with feedback coupled donor and service antennas as a part of a positive RF feedback 28 path. Under nominal operational conditions when feedback closed loop gain balance is less than <1 feedback 28 loop path may create linear amplitude distortions in the output amplified signal passband. Linear amplitude distortions can be readily observed at the output spectrum of the OFR and appear as gain ripple of the frequency response or as output noise floor ripple.

Through experimental measurements it has been determined that periodicity between these ripples depends on a total group delay in closed RF loop including signal propagation time in the feedback 28 between service 12 and donor 14 antennas. Ripple peak maximums correspond to |A(f)FB (f)|→1 approaching unity, i.e. onset of positive feedback 28; meanwhile minimum peak values correspond to negative feedback. Based on spectral measurement performed on OFR it has been estimated that 3 dB (peak to peak) amplitude ripples indicate that feedback 28 loop gain is −15 dB (15 dB margin) less than repeaters' gain in the forward direction. From practical consideration placement of service 12 and donor 24 antenna's typically yields better than 15 dB feedback margin provided that installation site allows for sufficient antenna separation. Under less than adequate installation situation, active stability monitoring is required.

Active stability monitoring is achieved through AGC voltage monitoring. With Reference to FIG. 3B AGC circuit monitoring has been implemented which detects the onset of feedback oscillation. AGC circuit provides gain control over various input signal levels. AGC response time is primarily determined by response time of RMS detector 119 and combination of Rf 135 and Cf 137. AGC control loop comprises the following circuit elements: AGC control 111, AGC variable element 113, First IF Gain stage 115, Second IF Gain stage 117, directional coupler 121, RMS detector 119, video filter $R_f$ 135 & $C_f$ 137. To simplify overall analysis pertaining to AGC circuit behavior noncontributory circuit elements are replaced with equivalent circuit elements. Equivalent circuit elements S1 30 and S2 32 are used to combine circuitry outside of AGC control loop. It is assumed (for sake of analysis) that circuit elements S1 30 and S2 32 do not contribute significantly to gain variation or their overall parametric changes are insignificant against AGC circuit actions.

Donor 26 to service 14 antenna feedback coupling is substituted by equivalent "FP" 28 block. Assign total Gain of the two amplifier stages 115 and 117 to a transfer function $G_{PA}$ ($P_{OUT}$) which is dependent on the output power level. The AGC circuit control element transfer function is $G_{AGC}(V_C)$ and the amount of signal feedback between donor 26 to service 14 antenna as function of distance is $G_{FB}(Dist)$. As it was noted before, oscillation condition appears when total gain in the closed loop is equal to or more than 1 and is shown in eq 1.

$$G_{AGC}(V_C) * G_{PA}(P_{OUT}) * G_{FB}(Dist) \geq 1, \quad (1)$$

or $$G_{AGC}(V_C) * G_{PA}(P_{OUT}) \geq \frac{1}{G_{FB}(Dist)}$$

Isolation as a function of distance function Iso(Dist) can now be written:

$$\text{or Gain}(V_C, P_{OUT}) \geq \text{Iso(Dist)} \quad (2)$$

where:

$$\text{Gain}(V_C, P_{OUT}) = G_{AGC}(V_C) * G_{PA}(P_{OUT}) - \text{total gain},$$

$$\text{Iso(Dist)} = \frac{1}{G_{FB}(Dist)} - \text{isolation between antennas.}$$

Figure 4:
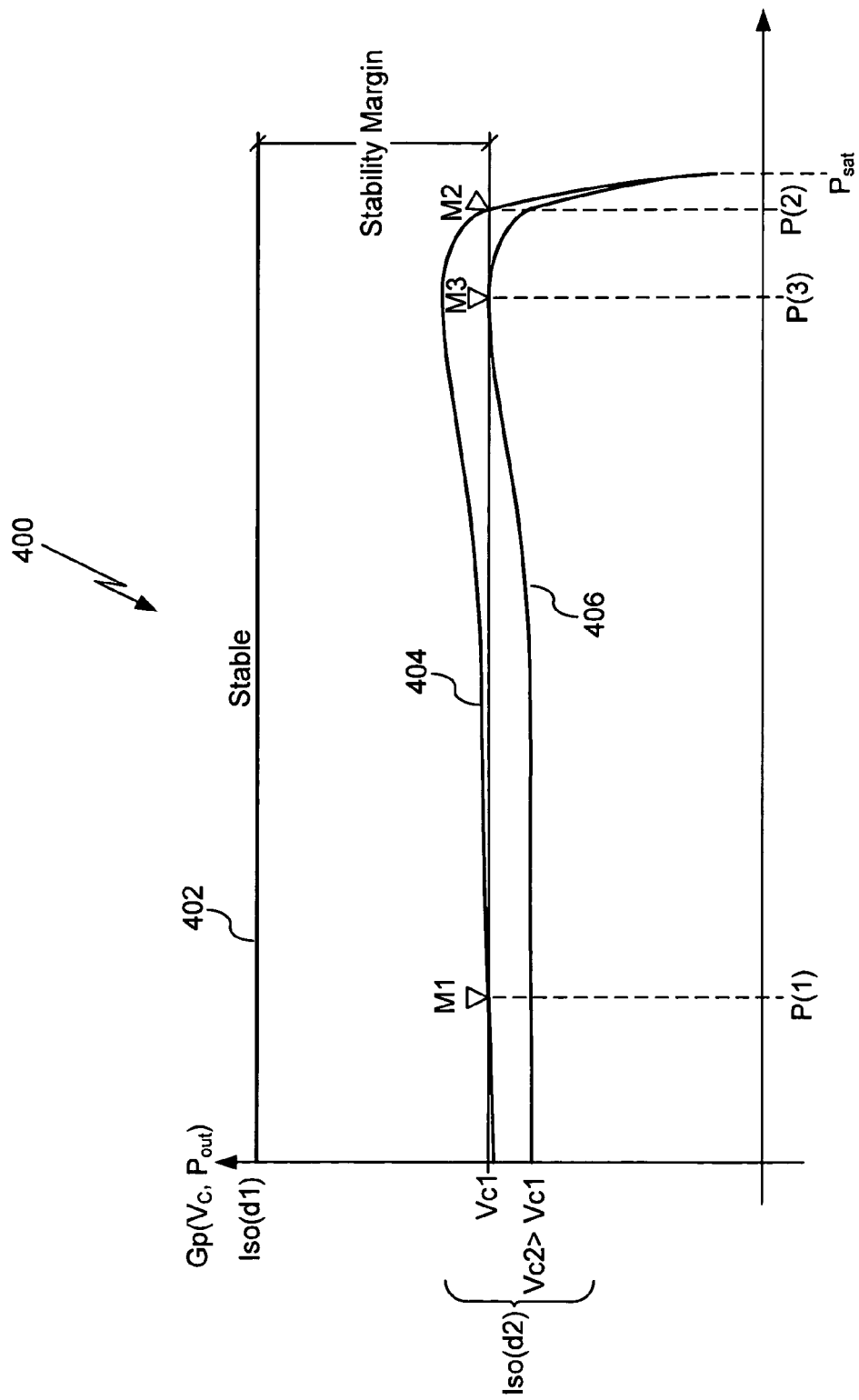
FIG. 4 is a graphical representation of the dynamic gain response of the on frequency repeater illustrating AGC behavior in accordance with the first or second embodiment of the invention.

Isolation Function Iso(Dist) vs. Gain($V_C$, $P_{OUT}$) are presented in FIG. 4 (400). Two different operating scenarios will now be described with reference to FIG. 4 and FIG. 7.

Under first operating conditions 402 donor 26 and service 14 antennas are separated by a Dist 1 such that feedback coupling Iso(d1) provides for oscillation free operation. Under such conditions total gain Gain($V_C$, $P_{OUT}$) even when set at maximum value is much smaller than Isolation Function Iso(Dist). It should be noted that Isolation Function Iso(Dist) is dependent on other variables other then separation distance, such as antenna directivity, surrounding object reflectivity, multipath propagation and others. These contributory environmental variables tend to be secondary in nature, but nevertheless their contributions should be carefully considered by those skilled in the art during OFR installation planning and implementation.

Under second operating conditions (404 & 406) donor 26 and service 14 antennas are separated by a distance d2. Distance d2 antenna separation is a critical separation distance that results in feedback coupling Iso(d2) function to provide for onset of feedback oscillation. With such antenna separation distance d2 OFR amplification chain 36 will experience onset of feedback oscillation described in detail by the following operational sequence.

To simplify operational sequence analysis, it is assumed that the OFR has no input signals present at the service antenna. Under such conditions the AGC control circuit 111 would command AGC control element 113, which can be a voltage variable attenuator, to a minimum allowable attenuation setting so as to provide a maximum gain 404 for the OFR. Corresponding control signal Vc value for a maximum gain setting is Vc1. Through extensive experimentation it was determined that self oscillation onset will commence at very low output power level P(1) which corresponds to feedback input signal M1. Typically, M1 signal is a combination of spurious and noise signals which contribute to the oscillation onset.

Once the oscillation feedback starts the output power levels increases rapidly from very low power until output stage saturation. Curve 404 shows power increase from P(1) to P(2). Oscillation rapid signal growth is detected by AGC detector 119, but its output is low pass filtered through Rf 135 and Cf 137. Hence, the AGC 111 control module is slow to respond to such rapid output power increase. Oscillatory signal increase (oscillatory power vs. time) takes place rapidly and is governed by the RF bandwidth of the amplification chain 36.

Timing measurements indicate P(1) to P(2) transitory rate (time=0 to t1) on the order of 100 nSec whilst AGC circuit time constants are typically much slower. The output power of the amplification chain 36 quickly approaches saturation power levels at which time the overall Gain($V_C$, $P_{OUT}$) begins to decrease (P(2) to P(sat)).

Once the output power of the amplification chain 36 reaches saturated power level it will remain at saturated power level unless output devices fail or AGC limits output power. Once AGC overcomes its response time constant the Gain($V_C$, $P_{OUT}$) will be reduced. With reduction of Gain output power will be first reduced from P(sat) to P(3) due to reduction in gain as controlled by AGC. From P(3) the output power will further be reduced due to AGC control voltage vc2 and slow time constant which effectively reduces output power level along second 406 curve. Once output power is below P(3) oscillation will rapidly subside as AGC have reduced available gain below oscillation feedback threshold. Oscillation will cease and output power level will drop below P(1) on the second gain curve.

Since there is no longer any measurable output power level (just thermal noise) the AGC will slowly increase available gain until there is enough gain for feedback oscillation to re-start again. Hence, the process is repeatable as long as feedback margin FB is below stability margin. The above mentioned system transitions can be readily monitored and recognized by monitoring AGC control voltages shown in FIG. 7. The saw tooth waveform has a characteristic period (T) and shape making its detection straightforward. For example, as noted above this saw tooth waveform detection may be implemented by a DSP in AGC control module 111. When oscillation is detected AGC control module 111 sends an OSC Monitor signal to the MCU which may provide an oscillation warning signal to the operator. Also AGC control module 111 may reset the AGC control voltage to a lower level to eliminate oscillation or reduce an amplification setting of an amplifier stage in the amplification chain.

Figure 5:
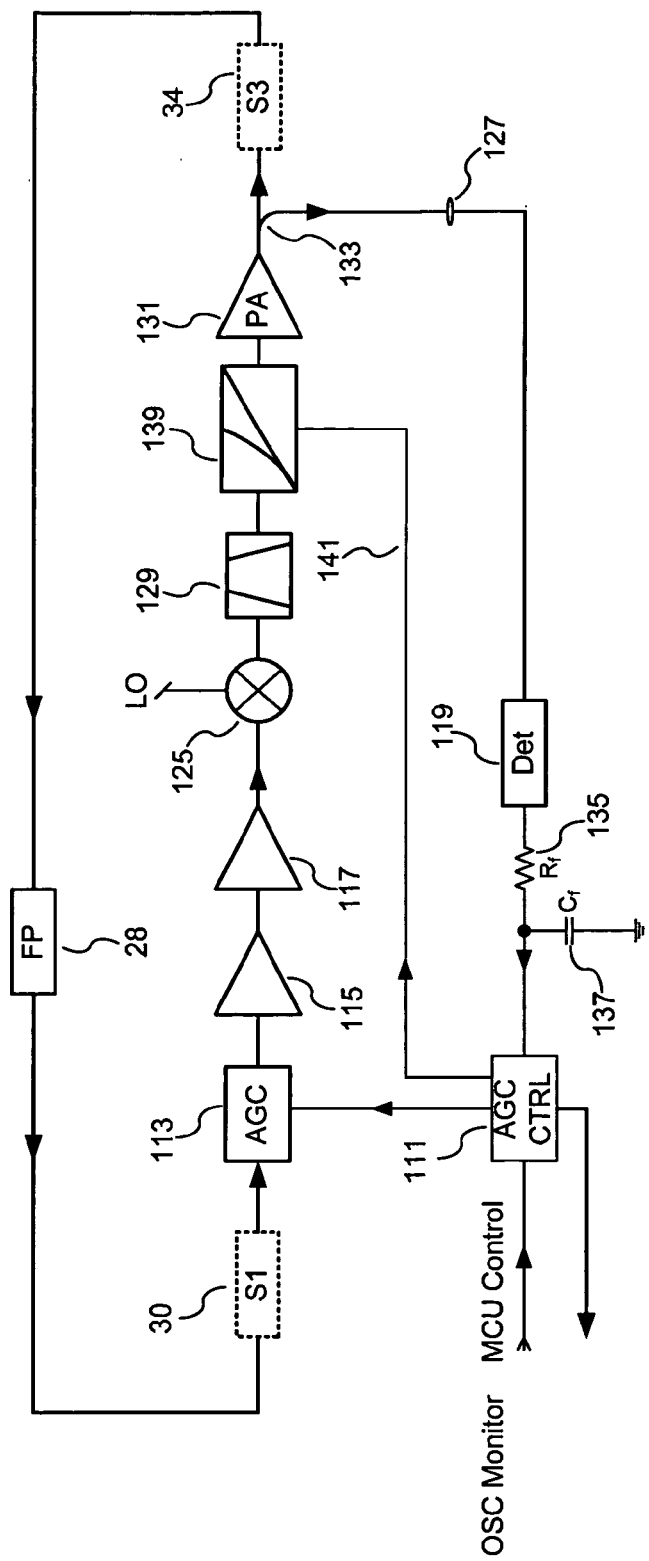
FIG. 5 is a system stability schematic drawing identifying control elements of the on frequency repeater with AGC in accordance with a third embodiment of the invention.

The saw-toothed AGC oscillation is highly dependent on having gain expansion in the amplification chain. Gain expansion is equivalent to having a non-linear response and is highly undesirable in repeaters operating with multiple simultaneous signals as it may result in higher intermodulation products. One way to avoid introduction of higher intermodulation product levels is to employ linear amplifiers that provide linear phase and amplitude response over dynamic range and introduce gain expanding 139 circuit on as needed basis. In FIG. 5 a gain expanding "rabbit circuit" 139 is used to alter dynamic gain response on as needed basis. Gain expanding 139 circuit (or rabbit) is enabled to alter dynamic gain response on as needed basis via control line 141. Such dynamic gain expanding circuit can be implemented using either a variable gain amplifier (VGA) or with a fast switching bi-state attenuator. The aforementioned devices and circuits topologies are commercially available and can be implemented by a skilled artisan. The control line 141 provides a suitable control signal to provide the desired nonlinear gain expansion under the control of the AGC control module 111. This may be provided by a suitably programmed DSP. For example oscillation detection can be periodically scheduled to run or it can be enabled under certain operating conditions.

The above AGC detection method can not be readily adapted to repeaters equipped with linear amplifiers. In wireless telephony linear amplifiers are used to provide linear operation so as to not introduce IMD's when amplifying multiple received carrier signals and different signal modulation schemes, such as WCDMA. Coincidently, a linear amplifier will exhibit a flat amplitude (AM-AM) and phase (AM-PM) dynamic response. An amplifier operating in Class A bias will have such response and therefore no oscillation transitory can be readily identified.

Hereinabove described oscillation detection method can be readily used in narrow passband, channelized repeaters where only one carrier signal is amplified, for example GSM. In such GSM repeaters Class AB biased amplifiers can be readily used. Class AB biased amplifier may provide adequate IMD levels while providing desired AM-AM dynamic amplitude behavior. For multi carrier amplification and/or broad band repeaters a linear operation must be maintained and conventionally designed class AB biased amplifiers may not offer sufficient linearity for a majority of applications.

Figure 6:
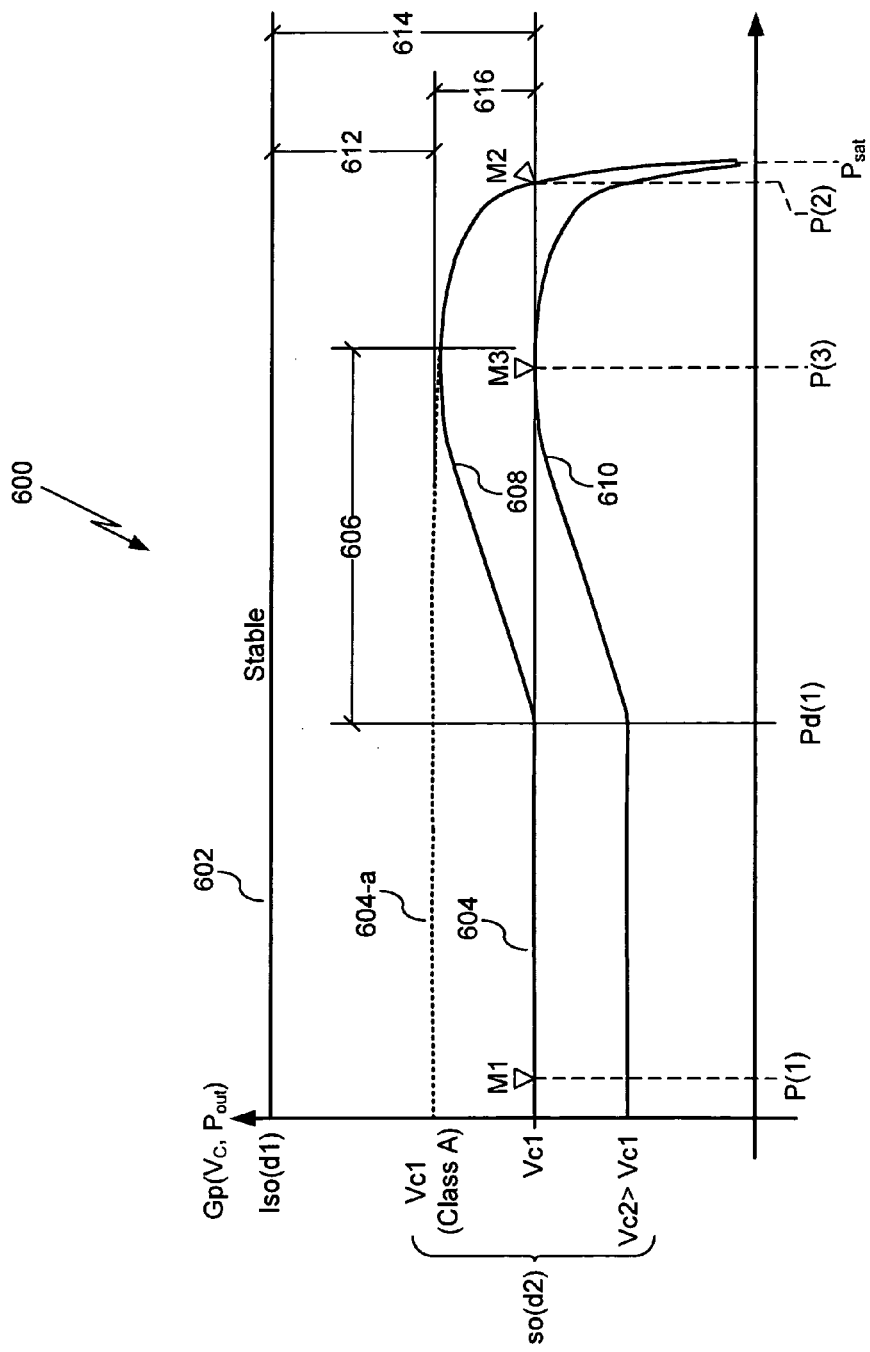
FIG. 6 is a graphical representation of the dynamic gain response of the on frequency repeater illustrating AGC behavior in accordance with the third embodiment of the invention.

The AGC oscillation detection method can be adapted to a repeater without degrading linear operation. With reference to FIG. 5 and FIG. 6 oscillation feedback detection will now be described. In FIG. 5 a feedback oscillation 28 path provides signal passage—similar to the earlier description. To reduce non-essential circuit clutter circuit module S1 (30) combines service 12 antenna, service antenna feed line 14, first duplexer 16, LNA 101, Bandpass filter 103, and second amplifier 105 and down conversion 107 mixer. Similarly, circuit module S3 (34) provides equivalent amplitude and phase behavior for the following circuit elements: second duplexer 22, donor antenna feed line 25 and donor antenna 26.

As described herein a feedback path FP (28) provides positive feedback path between donor 26 and service 12 antennas. The feedback signal is passed through S3 (34) equivalent circuit module and coupled to AGC 113. Output of AGC 113 is coupled through IF gain amplification stages (115 & 117) before being coupled to up-mixer 125. Output of the up-conversion mixer 125 is band pass filtered 129 to remove LO carrier and unwanted sideband before being coupled to a controlled rabbit circuit 139. Output of the rabbit circuit is coupled to power amplification stage 131 (PA). Output of PA 131 stage is sampled with a directional 133 coupler. Coupler 133 output through port is coupled to equivalent circuit module S3 34 which provides a source signal to feedback 28 path.

Coupler 133 coupled port is coupled to an envelope signal detector 119 with its output low pass filtered through $R_f$ 135 and $C_f$ 137. Low pass filtered envelope signal is coupled to AGC control circuit 111. AGC control circuit 111 receives MCU control commands under which control, among other things, whether controlled rabbit circuit 139 is enabled or alternatively disabled. An MCU feedback voltage is provided, which is used to establish presence of the FP oscillation. Primarily AGC control circuit 111 controls AGC 113 to provide desired gain control for repeater amplification chain.

Controlled rabbit circuit 139, when enabled, provides a gain expansion region 606 between output power level Pd(1) and P(2) along Gain vs. Ouput Power level along curve 604. When rabbit circuit 139 is disabled Gain vs. Output power level is slightly increased and returned to a linear condition as indicated by curve 604-a (dashed line). Typically the repeater is operated with rabbit circuit 139 disabled. Rabbit circuit 139 is typically enabled under selective operational conditions such installation procedure, during prolonged AGC operation or when excessive signal levels have been detected.

Since rabbit circuit 139 introduces non-linear amplitude response its enablement should be limited to periods when uplink path of OFR is not actively re-transmitting user traffic. Numerous detection schemes can be employed for detecting UE traffic presence (or absence) and can be readily adapted by those skilled in the art.

The above description is not intended to limit the invention to the form disclosed herein. Accordingly, variants and modifications consistent with the following teachings, and skill and knowledge of the relevant art, are within the scope of the present invention. The embodiments described herein are further intended to explain modes known for practicing the invention disclosed herewith and to enable others skilled in the art to utilize the invention in equivalent, or alternative embodiments and with various modifications considered necessary by the particular application(s) or use(s) of the present invention.

What is claimed is:

1. An on frequency repeater for a wireless network, comprising:
   a first antenna that is directed toward a first selected location in the wireless network to receive RF signals from said first selected location;
   an amplification chain coupled to the received signal and amplifying the level of the received signal to generate an amplified RF signal;
   a second antenna spaced apart from the first antenna and receiving and transmitting the amplified RF signal to a second location in the wireless network; and
   a feedback oscillation detection circuit coupled to the amplification chain in a gain control loop including a gain adjustment circuit and a gain control circuit, the feedback oscillation detection circuit detecting a saw tooth waveform in the gain control loop to detect onset of feedback oscillation between the first and second antennas.

2. An on frequency repeater as set out in claim 1, wherein said gain control loop further comprises a signal level detector coupled to said amplification chain.

3. An on frequency repeater as set out in claim 2, wherein said signal level detector comprises an envelope detector.

4. An on frequency repeater as set out in claim 2, wherein said gain control loop further comprises an RC filter circuit coupled to the output of the signal level detector.

5. An on frequency repeater as set out in claim 2, wherein said amplification chain includes an intermediate frequency amplification stage and an RF power amplifier and wherein said signal level detector is coupled to the output of the intermediate frequency amplification stage.

6. An on frequency repeater as set out in claim 2, wherein said amplification chain includes an intermediate frequency amplification stage and an RF power amplifier and wherein said signal level detector is coupled to the output of the RF power amplifier.

7. An on frequency repeater as set out in claim 1, wherein said first antenna is a donor antenna that is directed toward a selected base station and said second antenna is a service antenna that is directed toward a selected user coverage area.

8. An on frequency repeater as set out in claim 7, further comprising an uplink path between said second antenna and said first antenna, said uplink path comprising a second amplification chain receiving and amplifying RF signals from said second antenna and providing them to said first antenna for transmission to said first location.

9. An on frequency repeater as set out in claim 1, wherein said gain adjustment circuit comprises a voltage variable attenuator.

10. An on frequency repeater as set out in claim 1, wherein said feedback oscillation detection circuit issues a feedback oscillation warning signal upon detecting said saw tooth waveform indicating onset of feedback oscillation.

11. An on frequency repeater as set out in claim 1, wherein said feedback oscillation detection circuit reduces a gain setting of the amplification chain upon detecting said saw tooth waveform indicating onset of feedback oscillation.

12. An on frequency repeater for a wireless network, comprising:
   a first antenna that is directed toward a first selected location in the wireless network to receive RF signals from said first selected location;
   an amplification chain coupled to the received signal and amplifying the level of the received signal to generate an amplified RF signal;
   a nonlinear gain expander circuit coupled in the signal path of the amplification chain;
   a second antenna spaced apart from the first antenna and receiving and transmitting the amplified RF signal to a second location in the wireless network; and
   a feedback oscillation detection circuit coupled to the amplification chain in a gain control loop including a gain adjustment circuit and a gain control circuit, wherein the feedback oscillation detection circuit is coupled to control the gain expander circuit to selectively provide a nonlinear gain response, the feedback oscillation detection circuit detecting a saw tooth waveform in the gain control loop to detect onset of feedback oscillation between the first and second antennas during operation of the gain expander circuit.

13. An on frequency repeater as set out in claim 12, wherein said feedback oscillation detection circuit controls operation of the gain expander circuit to provide said nonlinear gain expansion when said repeater is not in user service.

14. An on frequency repeater as set out in claim 13, wherein said feedback oscillation detection circuit controls operation of the gain expander circuit to provide said nonlinear gain expansion periodically for oscillation monitoring.

15. A method for detecting feedback oscillation in a repeater having first and second antennas and one or more amplification paths, comprising:
   detecting a signal level in said amplification path;
   controlling the gain of the amplification path in response to said detected signal level with a gain control signal; and
   detecting a periodic nonlinear pattern in the gain control signal signaling onset of feedback oscillation between the antennas.

16. A method for detecting feedback oscillation in a repeater as set out in claim 15, wherein said periodic nonlinear pattern in the gain control signal comprises a saw tooth pattern.

17. A method for detecting feedback oscillation in a repeater as set out in claim 15, wherein detecting a signal level in said amplification path comprises detecting a signal envelope.

18. A method for detecting feedback oscillation in a repeater as set out in claim 17, further comprising filtering the detected signal envelope.

19. A method for detecting feedback oscillation in a repeater as set out in claim 15, further comprising selectively providing an additional nonlinear gain to the amplification path and wherein said detecting a periodic nonlinear pattern in the gain control signal is performed while providing said additional nonlinear gain.

20. A method for detecting feedback oscillation in a repeater as set out in claim 19, wherein said additional nonlinear gain to the amplification path is provided when the repeater is not in user service.

* * * * *